United States Patent [19]

Hirata et al.

[11] Patent Number: 5,074,194
[45] Date of Patent: Dec. 24, 1991

[54] HYDRAULIC DRIVING METHOD OF AND HYDRAULIC DRIVING APPARATUS FOR HYDRAULIC MACHINE

[75] Inventors: Toichi Hirata, Ushiku; Kuniaki Yoshida; Hideaki Tanaka, both of Tsuchiura; Genroku Sugiyama; Masakazu Haga, both of Ibaraki, all of Japan

[73] Assignee: Hitachi Construction Machinery Co., Ltd., Tokyo, Japan

[21] Appl. No.: 432,729

[22] PCT Filed: Mar. 2, 1989

[86] PCT No.: PCT/JP89/00218

§ 371 Date: Oct. 27, 1989

§ 102(e) Date: Oct. 27, 1989

[87] PCT Pub. No.: WO89/08200

PCT Pub. Date: Sep. 8, 1989

[30] Foreign Application Priority Data

Mar. 3, 1988 [JP] Japan .................................. 63-48750
Mar. 4, 1988 [JP] Japan .................................. 63-49622

[51] Int. Cl.⁵ ...................... F01L 31/00; F15B 15/044
[52] U.S. Cl. .......................... 91/525; 91/459; 60/327; 60/484
[58] Field of Search ................ 60/388, 390, 393, 420, 60/427, 433, 463, 484, 327; 91/459, 525, 427

[56] References Cited

U.S. PATENT DOCUMENTS

| 4,102,132 | 7/1978 | Palmer | 60/433 |
| 4,516,469 | 5/1985 | Sato et al. | 60/427 X |
| 4,625,622 | 12/1986 | Gunda et al. | 91/459 X |
| 4,718,329 | 1/1988 | Nakajima et al. | 91/459 X |
| 4,768,339 | 9/1988 | Aoyagi et al. | 60/427 |
| 4,773,302 | 9/1988 | Mizota et al. | 91/459 X |
| 4,800,721 | 1/1989 | Cemenska et al. | 60/393 |
| 4,811,561 | 3/1989 | Edwards et al. | 60/420 X |

FOREIGN PATENT DOCUMENTS

| 59-110901 | 6/1984 | Japan . |
| 60-65835 | 4/1985 | Japan . |
| 60-111958 | 7/1985 | Japan . |
| 61-89060 | 6/1986 | Japan . |
| 63-19402 | 1/1988 | Japan . |

Primary Examiner—Edward K. Look
Assistant Examiner—Hoang Nguyen
Attorney, Agent, or Firm—Fay, Sharpe, Beall, Fagan, Minnich & McKee

[57] ABSTRACT

In a hydraulic machine such as, for example, a hydraulic excavator equipped with hydraulic actuators, a hydraulic driving method and a hydraulic driving apparatus enable all the hydraulic actuators to be operated according to normal operational-speed characteristics (first mode). The method and the apparatus alter the operational-speed characteristics of at least one of the hydraulic actuators, according to other characteristics (second mode), in accordance with working contents. The actuators altered in this manner can be operated according to the operational-speed characteristics of the second mode, without exerting an influence upon the operational-speed characteristics of the remaining hydraulic actuators.

9 Claims, 5 Drawing Sheets

HYDRAULIC DRIVING METHOD OF AND HYDRAULIC DRIVING APPARATUS FOR HYDRAULIC MACHINE

TECHNICAL FIELD

The present invention relates to hydraulic driving methods of and hydraulic driving apparatuses for hydraulic machines and, particularly, to a hydraulic driving method of and a hydraulic driving apparatus for a hydraulic machine suitable for hydraulic construction machines such as a hydraulic excavator, a hydraulic crane and the like equipped with a plurality of hydraulic actuators, the hydraulic driving method and the hydraulic driving apparatus being capable of optionally selecting at least one of the plurality of hydraulic actuators to optionally alter operational-speed characteristics of the selected respective actuators, that is, maximum values of operational speeds or variation characteristics of the operational speeds.

BACKGROUND ART

A conventional hydraulic machine such as, for example, a hydraulic excavator comprises a hydraulic pump forming a source of hydraulic fluid and driven by rotational power of an engine, a plurality of actuators such as a running motor, a boom cylinder and so on driven by the hydraulic fluid supplied from the hydraulic pump, a plurality of control valves corresponding respectively to the actuators, such as a running-motor control valve, a boom-cylinder control valve and so on for controlling respectively flow directions and flow rates of the hydraulic fluid supplied to the actuators, and a control device for giving control signals respectively to drive sections of the respective control valves for the actuators in response to operational directions and amounts of operation of operating levers arranged correspondingly respectively to the actuators, thereby controlling operations of the respective control valves to bring the actuators respectively to requisite operational states (operational directions and operational speeds) in accordance with various workings.

Generally, the conventional hydraulic driving apparatus is so designed that the maximum opening degrees of the control valves determined at the initial specification cannot subsequently be altered. Accordingly, when the hydraulic driving apparatus is operated in such a state that the operational speeds of the respective actuators are maximum, hydraulic fluid of a predetermined discharge quantity determined by the rotational speed of the engine is supplied from the hydraulic pump to the actuators through the control valves, during a period for which the rotational speed of the engine driving the hydraulic pump is constant, so that the maximum operational speeds of the respective actuators are maintained constant. When it is desired to alter the maximum operational speeds of the actuators, the rotational speed of the engine must be altered to vary the discharge quantity of the hydraulic pump, that is, flow rates of the hydraulic fluid supplied respectively to the actuators. With such a way of altering the maximum operational speeds of the actuators, however, it is impossible to alter the operational speeds of only specific one or some of the plurality of actuators, because the hydraulic fluid from the hydraulic pump is supplied to all the actuators under the same condition.

In the hydraulic machine such as a hydraulic excavator or the like, however, there may occur a case where it is desired to slow down the operational speed of only a specific one of the actuators in accordance with the working contents in view of the actual working. For example, for the hydraulic excavator, there may be a case where such an operation as to draw the bucket horizontally is carried out for ground leveling. In such a case, relatively high working accuracy is required to draw the bucket horizontally toward this side, so that it is desired to slow down the operational speed of only the bucket cylinder or the operational speed of only the arm cylinder. In the conventional hydraulic driving apparatus, however, it is impossible to slow down the operational speeds of only specific some of the plurality of actuators, as described previously. That is, if the rotational speed of the engine is lowered, the operational speeds of all the actuators such as the boom cylinder, the arm cylinder and the like are slowed down uniformly. In this manner, if the rotational speed of the engine is lowered in an attempt to improve the working accuracy, the operational speeds of all the actuators such as the bucket cylinder, the arm cylinder and so on are slowed down simultaneously, resulting in lowering of the working efficiency. Conversely, if the rotational speed of the engine is kept high in an attempt to improve the working efficiency to set the operational speeds of all the actuators to their respective rapid states, this leads to lowering of the working accuracy. Thus, it has been impossible for the conventional hydraulic driving apparatus to satisfy the working accuracy and the working efficiency simultaneously. Further, also in crane working in which a load is hung by a bucket and is moved up and down, there arises such a problem similar to that described previously that operational speed of a specific actuator is required to be slowed down for the purpose of prevention of swing of load.

As the prior art of a hydraulic driving apparatus for solving a problem similar to that discussed above, there are JP-A 60-65835, JP-U 60-111958 and JP-U 61-89060. JP-U 60-65835 discloses a method of operating a construction machine, in which a switch enabling minute speed regulation is provided at an operating lever for regulating an amount of displacement of a spool of a main valve, and an output characteristic of an operational amplifying circuit is altered on the basis of an output signal from the switch, to improve operability at the minute speed due to the operating lever. JP-U 60-111958 discloses an operating circuit of an actuator for a construction machine. In the operating circuit, a valve, in which a gain relating to a drive signal is varied depending upon rotational speed of an engine, is used in substitution for a conventional slow return valve provided in a return line from a hydraulic cylinder, to prevent a pulsating phenomenon and cavitation in the hydraulic cylinder, and to achieve energy saving. JP-U 61-89060 discloses a working-machine operating apparatus for a hydraulic power excavator, in which, from a plurality of operational modes set beforehand so as to be capable of optionally selecting working-machine speed, one operational mode can be selected in accordance with the working contents. However, none of the prior art references discloses a technique capable of solving the previously discussed problem.

It is a first object of the invention to provide a hydraulic driving method of a hydraulic machine, in which, in order to solve the above problem, respective operations of a plurality of hydraulic actuators are controlled in accordance with working contents, thereby being capable of improving both working accuracy and working efficiency.

It is a second object of the invention to provide a hydraulic driving apparatus for a hydraulic machine, in which, in a hydraulic machine equipped with a plurality of hydraulic actuators, operational-speed characteristics of at least one of the plurality of hydraulic actuators can be altered in accordance with working contents without exerting an influence upon the remaining actuators, thereby improving both working accuracy and working efficiency.

DISCLOSURE OF THE INVENTION

A hydraulic driving method of a hydraulic machine, according to the invention, is applied to the hydraulic machine equipped with a plurality of hydraulic actuators, and is capable of optionally altering operational-speed characteristics of at least one of the plurality of hydraulic actuators in accordance with working contents, without altering operational-speed characteristics of the remaining hydraulic actuators.

A hydraulic driving apparatus for a hydraulic machine, according to the invention, is an apparatus realizing the above hydraulic driving method, which is premised on an assumption of being applied to a hydraulic machine comprising a plurality of hydraulic actuators, a plurality of control valves arranged to correspond respectively to the plurality of hydraulic actuators from a source of hydraulic fluid, and operating-lever devices arranged to correspond respectively to the control valves, for outputting operational signals for operating the respective control valves. The hydraulic driving apparatus is so arranged as to include an operational-mode switching commander which outputs a switching command signal for altering operational modes of the respective hydraulic actuators to a first mode for normal operational-speed characteristics, or to a second mode for special-work operational-speed characteristics. The apparatus further includes a second-mode setting commander which outputs a setting command signal for setting the second mode of the plurality of hydraulic actuators, and a control circuit having inputted thereto the operational signals outputted by the operating-lever devices, the switching command signal outputted by the operational-mode switching commander and the setting command signal outputted by the second-mode setting commander, the control circuit setting the second mode with respect to at least one of a plurality of the actuators on the basis of said setting command signal, the control circuit outputting control signals to the respective control valves for operating the hydraulic actuators in the first or second mode on the basis of said switching command signal and said operational signals.

DETAILED DESCRIPTION OF THE PREFERRED EMBODIMENTS

Embodiments of the invention will be described below with reference to the drawings.

Figure 1:
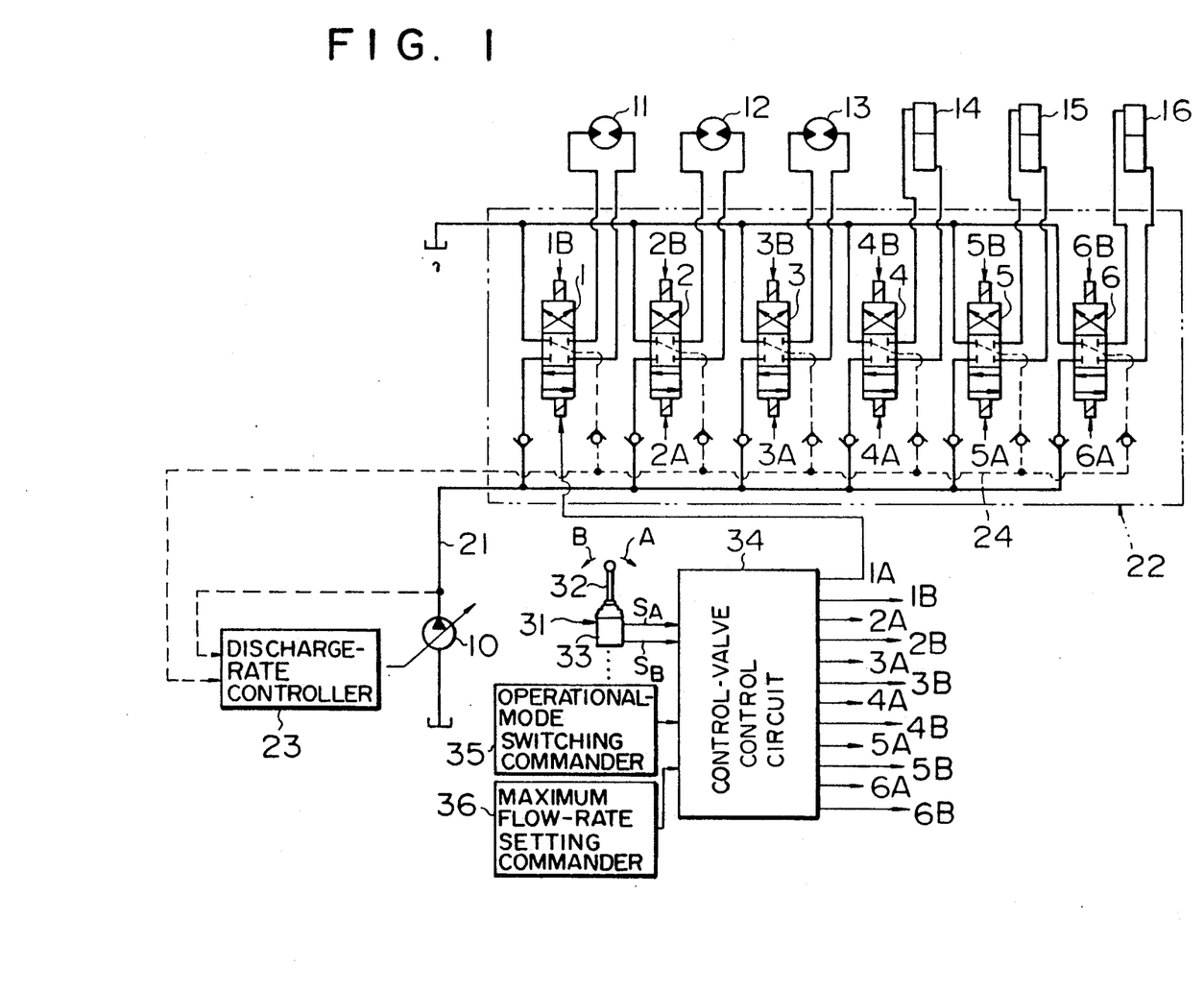
FIG. 1 is a view of the entire arrangement showing a hydraulic system and an electric system of a hydraulic machine to which a hydraulic driving apparatus relating to the invention is applied.

A hydraulic machine illustrated in FIG. 1 is a hydraulic excavator which is equipped with six actuators.

An arrangement of a hydraulic system will first be described. The reference numerals 11 through 16 designate the six hydraulic actuators with which the hydraulic excavator is equipped. Specifically, the reference numeral 11 denotes a running motor; 12, a left-hand running motor; 13, a right-hand running motor; 14, a boom cylinder; 15, an arm cylinder; and 16, a bucket cylinder. Hydraulic fluid is supplied from a single common hydraulic pump 10 to each of the plurality of actuators. The arrangement is such that the hydraulic fluid discharged from the hydraulic pump 10 is supplied to each of the actuators through a line 21 and, subsequently, is returned to the hydraulic pump 10. In this connection, the hydraulic pump 10 is driven at constant rotational speed by rotational power of an engine, not shown.

Control valves 1, 2, 3, 4, 5, 6 are arranged to correspond respectively to the actuators 11 through 16, on the line 21 between the hydraulic pump 10 and the respective actuators 11 through 16. Here, the reference numeral 1 denotes a running-motor control valve; 2, a left-hand running-motor control valve; 3, a right-hand running-motor control valve; 4, a boom-cylinder control valve; 5, a arm-cylinder control valve; and 6, a bucket-cylinder control valve. Each of the control valves 1 through 6 has an operational state that is determined by a control signal generated on the basis of an operational signal outputted from an operating-lever device for a corresponding one of the actuators. Each control valve has such a function as to control flow direction and flow rate of the hydraulic fluid in a corresponding one of the actuators. Each of the control valves 1 through 6 has two drive sections such that said flow direction is determined depending on which one of the drive sections is operated, and said flow rate is determined depending upon regulation of an opening degree of the control valve in the operation of each driving section. The above control valves 1 through 6 are formed as a control-valve unit 22 as indicated by the double-dotted line in FIG. 1.

The reference numeral 23 denotes a discharge-rate controller for the hydraulic pump 10. This discharge-rate controller 23 compares the hydraulic pressure in the line 21 that is a discharge section of the hydraulic pump 10 with hydraulic pressure taken out through a pilot line 24 from the control valves 1 through 6, corresponding to a maximum one of the loads of the respective actuators, to control the discharge rate of the hydraulic pump 10 in such a manner that a difference between the two hydraulic pressures is always brought to a predetermined value.

An arrangement of the electric system will next be described. The reference numeral 31 designates an operating-lever device which is provided with an operating lever 32 capable of being operated in two directions A, B, and an operating-signal generator 33 for outputting operating signals $S_A$, $S_B$ (S is hereinafter used to generally represent an operational signal) corresponding respectively to the operational directions A, B. Six operating-lever devices 31 are arranged to correspondingly respectively to the actuators. The operational signals $S_A$, $S_B$ outputted from the operational-signal generator 33 of the operating-lever device 31 is supplied to a control-valve control circuit 34. The control-valve control circuit 34 carries out signal-processing subsequently to be described, with respect to the operational signals $S_A$, $S_B$ from the illustrated operating-lever device 31, to generate control signals 1A, 1B corresponding respectively to the operational signals $S_A$, $S_B$. The control signals 1A, 1B outputted in the manner described above are given respectively to the two drive sections of the control valve 1 as signals for driving respectively the drive sections. Similarly, control signals (2A, 2B), (3A, 3B), (4A, 4B), (5A, 5B), (6A, 6B) corresponding respectively to the remaining five operating-lever devices, not shown, are given respectively to the control valves 2 through 6 in their respective relationships illustrated.

The reference numeral 35 denotes an operational-mode switching commander which outputs switching command signals for altering operational modes of the respective actuators 11 through 16. Setting is made by OFF-operation of the operational-mode switching commander 35 such that control of opening degrees of the respective control valves 1 through 6 (the opening degrees are in proportional relationship to the hydraulic flow rates supplied respectively to the actuators 11 through 16) is brought to first modes. On the other hand, setting is made by ON-operation of the operational-mode switching commander 35 such that the control is brought to second modes. Here, the first modes are modes in which the actuators are operated at normal operational-speed characteristics and which have large maximum operational speeds. The second modes are modes in which the actuators are operated in other operational-speed characteristics which are newly set in consideration of peculiarity of working for which accuracy is required. The second modes have relatively small maximum operational speeds.

The reference numeral 36 designates a maximum flow-rate setting commander which outputs setting command signals for setting said second modes in addition to said first modes in relation to the operational-speed characteristics of the respective actuators. When the maximum flow-rate setting commander 36 is turned on, the maximum opening degrees of the respective control valves are varied under conditions subsequently to be described, whereby the respective maximum operational speeds of selected one or more actuators 11 through 16 are optionally altered and set.

Figure 2:
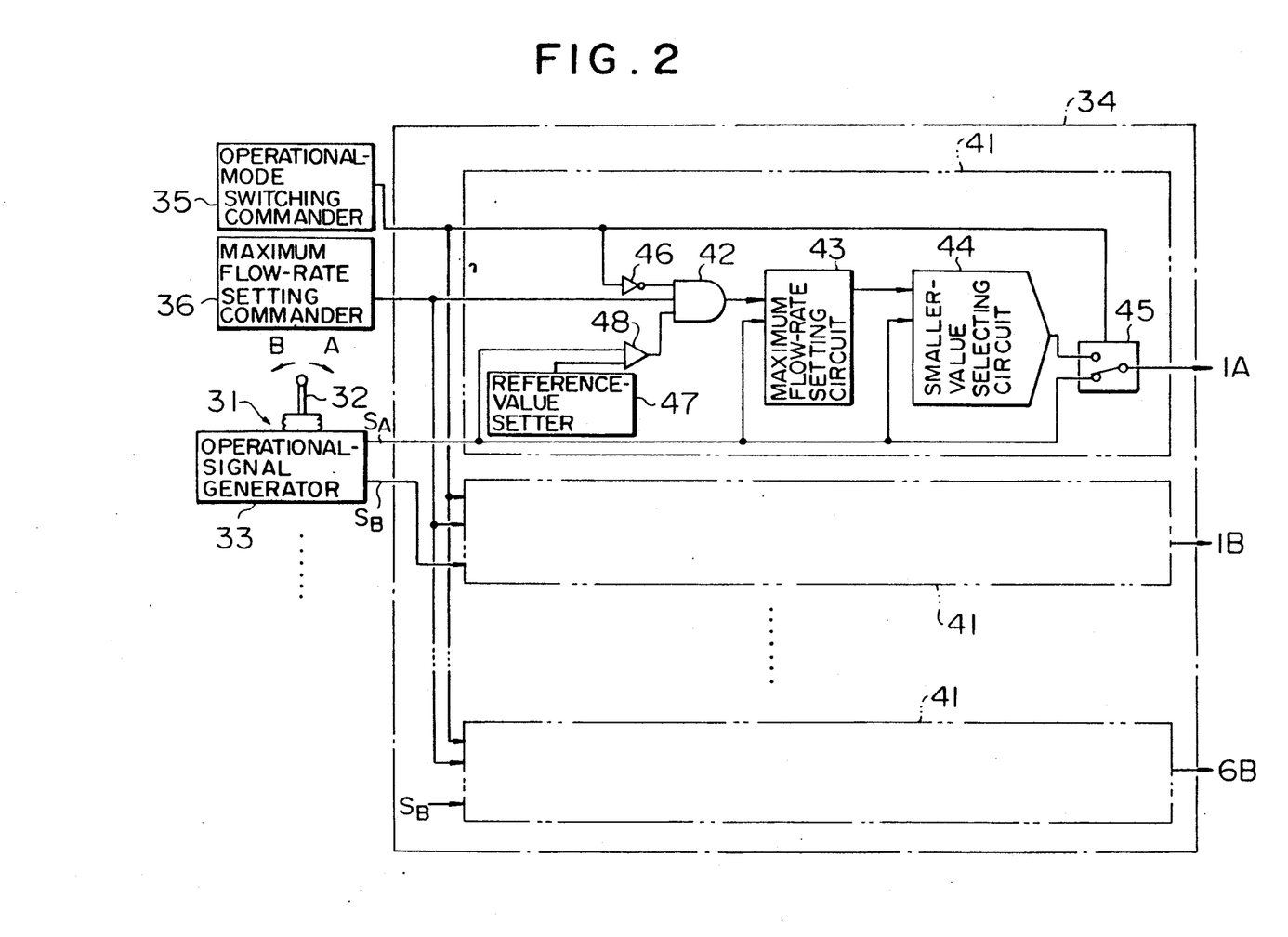
FIG. 2 is a circuit diagram showing a first embodiment of a control-valve control circuit.

An arrangement of a first embodiment of the control-valve control circuit 34 will specifically be described with reference to FIG. 2. In FIG. 2, circuit elements identical with those described with reference to FIG. 1 are designated by the same reference numerals. That is, the reference numeral 31 denotes an operating-lever device; 32, an operating lever; 33, an operational-signal generator; 35, an operational-mode switching commander; and 36, a maximum flow-rate setting commander. Further, the reference characters $S_A$, $S_B$ denote said operational signals, and the reference numerals 1A through 6B designate said control signals.

The reference numeral 41 designates a maximum opening-degree limiting circuit. The maximum opening-degree limiting circuit 41, whose internal arrangement is illustrated in FIG. 2, is a circuit corresponding to the operational signal $S_A$ outputted from the operating-lever device 31. This circuit has such a function as to indicate the maximum opening degree of the control valve 1 realizing the normal maximum operational speed (first mode) in relation to the actuator 11, or a limited maximum opening degree of the control valve 1 realizing the limited maximum operational speed (second mode). Similarly and additionally, a total of eleven maximum opening-degree limiting circuits 41 are arranged to correspond respectively to the operational signal $S_B$ outputted from the illustrated operating-lever device 31 and, in addition thereto, operational signals $S_A$, $S_B$ from the remaining additional five operating-lever devices, not shown. These maximum opening-degree limiting circuits are all the same in internal arrangement as each other and, accordingly, the maximum opening-degree limiting circuits except for one are illustrated merely as blocks indicated by the double-dotted lines. That is, the control-valve control circuit 34 includes twelve maximum opening-degree limiting circuits 41 inclusive of the illustrated one. The aforesaid control signals 1A through 6B are outputted correspondingly respectively to these maximum opening-degree limiting circuits 41.

The maximum opening-degree limiting circuit 41 comprises an AND circuit 42 having three input terminals, a maximum flow-rate setting circuit 43, a smaller-value selecting circuit 44, and a switch 45 having two choices. When the operational-mode switching commander 35 is in the OFF-state so that its output is at a low level, the switch 45 is set to a normal operational-speed characteristic (first mode) in which the operational signal $S_A$ supplied from the operational-signal generator 33 is outputted directly as the control signal 1A. On the other hand, when the operational-mode switching commander 35 is in the ON-state so that its output is at a high level, the switch 45 is set to the other operational-speed characteristic (second mode) in which a signal for limiting the maximum value of the flow rate through the actuator 1, obtained by the AND circuit 42, the maximum flow-rate setting circuit 43, the smaller-value selecting circuit 44 and so on is outputted as the control signal 1A. In the AND circuit 42 having three input terminals, an output signal from the operational-mode switching commander 35 inverted by a NOT circuit 46 is inputted to one input terminal, and an output signal from the maximum flow-rate setting commander 36 is inputted to another input terminal. Inputted to the other input terminal is an output signal from a comparator 48 resulting from comparison by the same between the operational signal $S_A$ and a reference value outputted from a reference-value setter 47. The reference value at the reference-value setter 47 is used to judge whether or not the operating lever 32 is operated. The maximum flow-rate setting circuit 43 has inputted thereto the output signal from the AND circuit 42 and the operational signal $S_A$, and is provided therein with a memory section. The relationship (maximum value of the hydraulic flow rate) between a stroke (amount of operation) of the operating lever 32 in the direction A and the hydraulic flow rate at the control valve 1 can be stored in the memory section of the maximum flow-rate setting circuit 43. Further, it is possible for the maximum flow-rate setting circuit 43 to alter the relationship stored in the memory section between the stroke and the hydraulic flow rate, that is, the maximum value of the hydraulic flow rate, on the basis of a condition that the output from the AND circuit 42 is at the high level, and on the basis of the amount of operation due to the operating lever 32. The smaller-value selecting circuit 44 has inputted thereto the output signal generated on the basis of said maximum value stored in the maximum flow-rate setting circuit 43 and the operational signal $S_A$ outputted from the operational-signal generator 33. The smaller-value selecting circuit 44 has such a function as to compare both the signals with each other on the basis of the stroke of the operating lever 32 such that when both the signals are the same in value as each other, the value is generated as an output signal, while when both signals differ from each other, the value of smaller one of the signals is generated as an output signal.

The arrangement of the above-described maximum opening-degree limiting circuit 41 is the same as that of each of the remaining eleven maximum opening-degree limiting circuits. Accordingly, the twelve maximum opening-degree limiting circuits are so arranged respectively as to have inputted thereto the switching command signals from the operational-mode switching commander 35, the setting command signals from the maximum flow-rate setting commander 36, and the operational signals outputted from the operating-lever devices corresponding respectively to the maximum opening-degree limiting circuits.

The operation of the hydraulic driving apparatus including the control-valve control circuit 34 having the above-described arrangement will be described.

Figure 3:
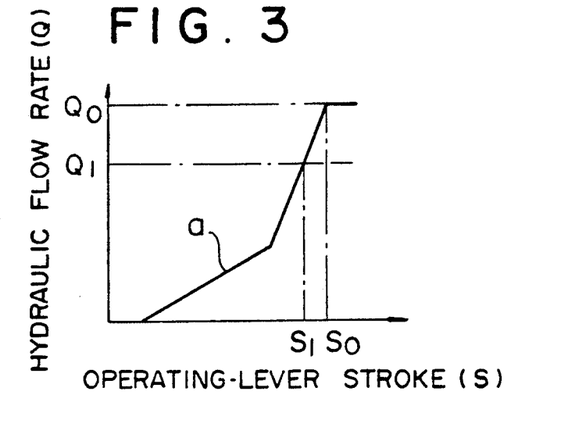
FIG. 3 is a characteristic view showing the relationship between an operating-lever stroke and hydraulic flow rate in the first embodiment.

A characteristic a indicated by the thick solid line in FIG. 3 indicates the relationship (first mode) between an operating-lever stroke S (represented by the operational signal) and hydraulic flow rate Q in the control valve, representing a normal operational-speed characteristic in case where no consideration is made to special working. The maximum flow rate in this case is set to $Q_0$ at a stroke $S_0$ approximate to the maximum stroke. This normal operational-speed characteristic is a characteristic which occurs at the control signal 1A if the operating lever 32 is operated when the output from the operational-mode switching commander 35 is at the low level and the switch 45 is connected directly to the operational-signal generator 33. The normal operational-speed characteristic is a characteristic that is the output per se from the operational-signal generator 33. Further, the maximum flow rate $Q_0$ in the normal operational-speed characteristic is beforehand stored in the memory sections of all of the maximum opening-degree limiting circuits 41 in an initial state.

When the operational-mode switching commander 35 is in its OFF-state so that the low-level signal is outputted, all the operating-lever devices 31 can operate their respectively corresponding actuators in the first modes that are the conventional operational-speed characteristics indicated by a in FIG. 3.

When it is desired to alter the maximum operational speeds of a specific one or more of the actuators 11 through 16 in accordance with special working, the maximum flow-rate setting commander 36 is turned on in such a state that the operational-mode switching commander 35 is turned off. By doing so, in each of the maximum opening-degree limiting circuits 41, the two input terminals of the AND circuit 42 that are affected by commanders 35 and 36 are brought respectively to high levels so that the gate is brought to such a state as to be opened. Thus, it is made possible to alter and set the maximum flow-rate value stored in the memory section of the maximum flow-rate setting circuit 43, to another optional value. In this state, let it be supposed that an operator operates the operating lever 32 illustrated, for example, in FIG. 2 in the direction A to carry out such a setting as to slow down the operational speed of the actuator 11. When the operating lever 32 is operated in the direction A, the operational signal $S_A$ is compared with the aforesaid reference value at the comparator 48. If the operating lever 32 is operated effectively, the comparator 48 gives a high-level signal to the remaining input terminal of the AND circuit 42. Thus, the output of the AND circuit 42 is brought to the high level. The aforementioned operational signal $S_A$ is simultaneously inputted also to the maximum flow-rate setting circuit 43. This operational signal $S_A$ is stored in the memory section of the maximum flow-rate setting circuit 43 on condition that the output of the AND circuit 42 is brought to the high level. Next, as shown in FIG. 3, when the maximum flow-rate setting commander 36 is turned off at the position of the operational-level stroke $S_1$, the output of the AND circuit 42 is brought to the low level so that the above-described storing operation is stopped. After this, the flow rate $Q_1$ determined correspondingly to the stroke $S_1$ is retained as a maximum value (indicated by a broken line in the figure). In this manner, with reference to the operation of the operating-lever device 31 for the running motor 11 in the direction A, the flow rate $Q_1$ that is smaller in value than $Q_0$ can newly be stored as a maximum value in the memory section of the corresponding maximum flow-rate setting circuit 42.

In a manner similar to that described above, in the remaining actuators 12 through 16, the maximum flow rates of the respective operating-lever devices with reference to the operating directions A, B can be altered as working conditions demand. When it is desired to alter the respective maximum operational speeds of the plurality of actuators, the maximum flow-rate setting commander 36 is turned on. In such state, each operating lever is operated to set a corresponding new maximum flow rate. If, subsequently, the maximum flow-rate setting commander 36 is turned off, it is possible to carry out alteration of the maximum operational speeds collectively with respect to the plurality of actuators.

In connection with the above, even during alteration and setting of the maximum operational speed, the operational signal is supplied, as the control signal, to the control valve through the switch 45. Accordingly, if the hydraulic pump 10 is operated, the actuator is actually operated. Thus, an operator can set an optimum operational speed while carrying out actual experimental work by means of the operating lever.

After the operational speeds of a requisite one or more of the actuators 11 through 16 have been slowed down, if the actuators in question are operated with the operational-speed characteristics (second modes) having limited maximum operational speeds, the operational-mode switching commander 35 is turned on. By doing so, the switch 45 is switched to the side of the smaller-value selecting circuit 44. Further, the output from the NOT circuit 46 is brought to the low level so that the AND circuit 42 is maintained closed. In such state, when the operating lever 32 is, for example, in the direction A, the small-value selecting circuit 44 compares the operational signal $S_A$ with the output value (signal representative of the flow rate $Q_1$) of the maximum flow-rate setting circuit 43, to always output a signal representative of a smaller value. As a result, as shown in FIG. 3, the operational signal $S_A$ is selected until the stroke reaches $S_1$, so that the flow rate changes in the characteristic indicated by the solid line. If the stroke exceeds $S_1$, the output value of the maximum flow-rate setting circuit 43 is selected. Thus, the control signal 1A is outputted which controls the opening degree of the control valve 1 so as to be maintained at the limited maximum flow rate $Q_1$ indicated by the broken line. In this manner, it is possible to operate the actuator 11 in another operational-speed characteristic (second mode, maximum flow rate $Q_1$) different from the normal operational-speed characteristic (first mode, maximum flow rate $Q_0$). The remaining actuators which have been altered and set in their respective maximum flow rates can also similarly be operated in the second modes, by turning on the operational-mode switching commander 35.

In connection with the above, even if the maximum flow-rate setting commander 36 is turned on so that it is made possible to set the operational-speed characteristic of the second mode with reference to each actuator, the operational-speed characteristic of the first mode is maintained as it is, if the alteration and setting actions due to operation of the operating lever are not carried out.

According to the hydraulic driving apparatus of the aforementioned embodiment, the operational-speed characteristics of only specific selected one or more of the plurality of actuators can be altered without altering the operational-speed characteristics of the remaining actuators, making it possible to achieve improvement in the working accuracy and the working efficiency.

Figure 4:
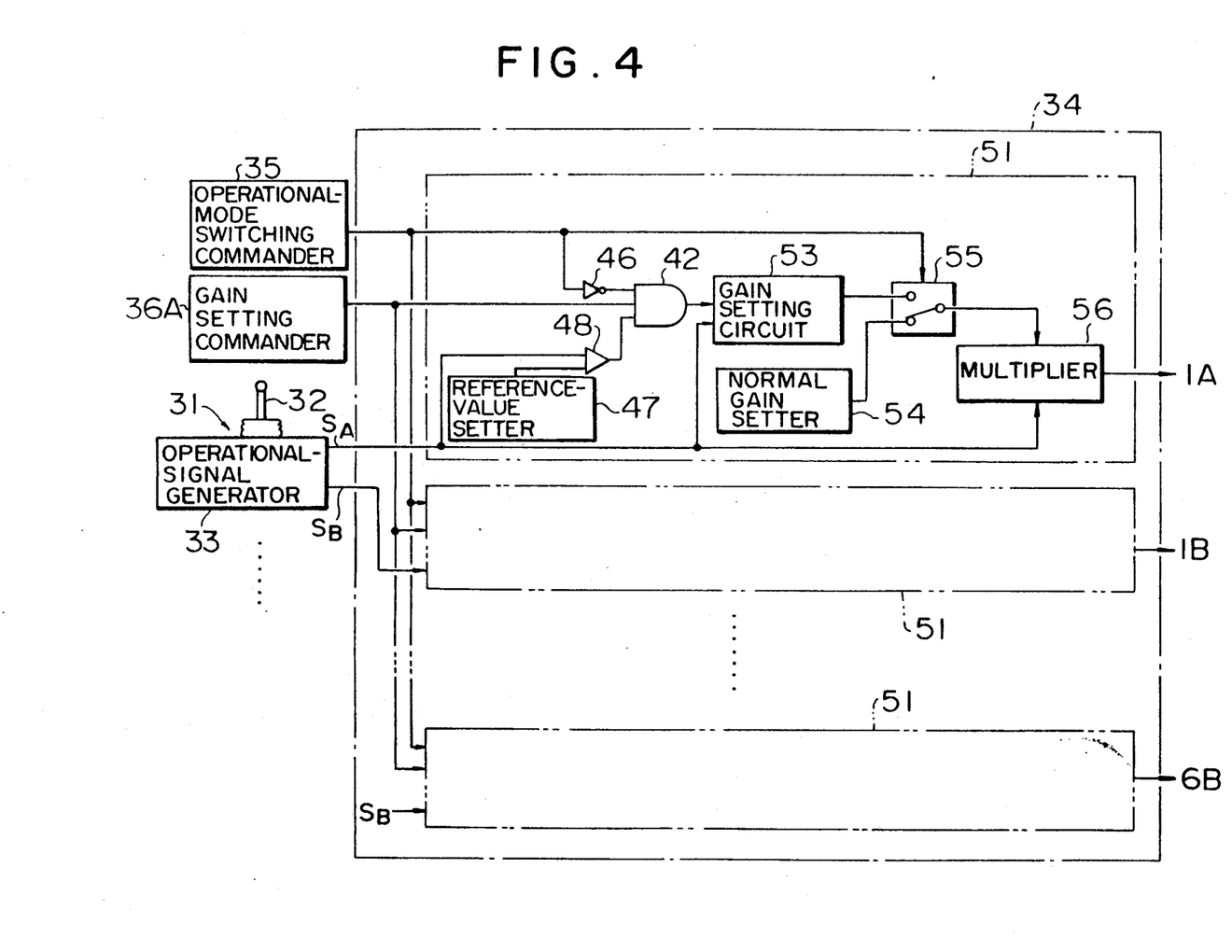
FIG. 4 is a circuit diagram showing a second embodiment of the control-valve control circuit.

An arrangement of a second embodiment of the control-valve control circuit 34 will specifically be described with reference to FIG. 4. Circuit elements similar to those described with reference to FIG. 2 are designated by the same reference numerals, and the detailed description of the circuit elements will be omitted. This control-valve control circuit 34 employs gain altering circuits 51 in place of the aforesaid maximum opening-degree limiting circuits 41. There are arranged twelve gain altering circuits 51 with respect to the operating signals $S_A$, $S_B$ of the six operating levers 32 for the actuators 11 through 16. In FIG. 4, an operating-lever device 31, an operating-mode switching commander 35, an AND circuit 42, a reference-value setter 47, a NOT circuit 46 and a comparator 48 are the same as those described with reference to the aforementioned first embodiment.

The reference numeral 36A denotes a gain setting commander which serves as a substitute for the aforesaid maximum flow-rate setting commander 36. The gain setting commander 36A is used to enable alteration of a gain to alter and set control-valve hydraulic flow rates (proportional to opening degrees) which finally determine the operational speeds of the actuators. Here, the gain is defined as a scale-factor value within a range of from 0 to 1 to be multiplied by the operational signal outputted from the operational-signal generator 33 corresponding to the amount of operation of the operating lever 32.

The gain altering circuit 51 further includes a gain setting circuit 53 having inputted thereto the output signal from the AND circuit 42 and the operational signal outputted from the operational-signal generator 33, a normal gain setter 54 having set therein a gain of "1", a switch 55 connected to either one of an output terminal of the normal gain setter 54 and an output terminal of the gain setting circuit 53, and a multiplier 56 multiplying a gain signal outputted from the switch 55 by the operational signal outputted from the operational-signal generator 33, to output a control signal. In an initial state, the gain of "1" is beforehand stored in a memory section within the gain setting circuit 53. However, this gain is altered within the range of from 0 to 1 under a predetermined condition and can newly be set. The aforesaid gain setting commander 36A is employed to enable its ON-operation to alter and set the gains set respectively in the gain setting circuits 53 of all of the gain altering circuits 51, to new values.

When the output from the operational-mode switching commander 35 is at a low-level signal, the switch 55 is connected to the normal gain setter 54 so that the gain given to the multiplier 56 is always "1". Accordingly, in the first mode in which the operational-mode switching commander 35 is turned off so that its output is at the low level, the operational signal $S_A$ outputted from the operational-signal generator 33 with reference to, for example, the actuator 11 is supplied to the drive section of the control valve 1 as it is as the control signal 1A. In this manner, the actuator 11 is operated in the normal operational-speed characteristic a. The same is applicable to the operations of the remaining actuators 12 through 16.

When the gain setting commander 36A is turned on while the output from the operational-mode switching commander 35 is maintained at the low level, operations of the respective operating levers 32 with reference to all of the gain altering circuits 51 make it possible to alter the gain values set respectively in the gain setting circuits 53. That is, when the operating lever 32 is operated, the high-level signal is inputted to the gain setting circuit 53 from the AND circuit 42 under the same condition as that described with reference to FIG. 1, so that it is possible to carry out alteration and setting of the gain in the gain setting circuit 53. At this time, beforehand stored in the gain setting circuit 53 are $S_L$ and $S_0$, that is, an operational-lever stroke $S_L$ at which hydraulic fluid starts to pass through in the normal operational-speed characteristic, and an operational-lever stroke $S_0$ which is brought to the maximum flow rate $Q_0$. On the basis of these $S_L$, $S_0$ and the operational-lever stroke $S_1$ corresponding to the hydraulic flow rate $Q_1$ outputted following operation of the operating lever 32, the following calculation obtaining a gain K with reference to a corresponding one of the control valves is executed at the gain maximum flow-rate setting circuit 53:

$$K = (S_1 - S_L)/(S_0 - S_L)$$

This value of K ($<1$) is stored.

When, subsequently, the gain setting commander 36A is turned off, the aforesaid value of K is retained in the gain setting circuit 53 so that a new gain K is set.

Figure 5:
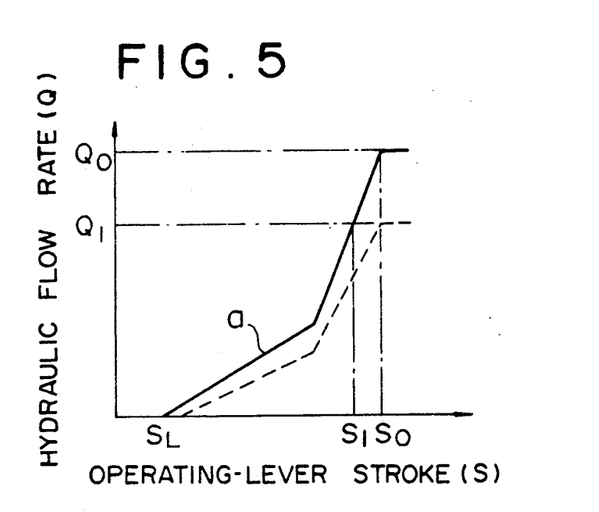
FIG. 5 is a characteristic view showing the relationship between an operating-lever stroke and hydraulic flow rate in the second embodiment.

As described above, when, with reference to the requisite operational directions of the plurality of actuators 11 through 16, new gains are set with respect to a specific one or more of the actuators and, subsequently, the operational-mode switching commander 35 is turned on to output the high-level signal, the switches 55 of all of the gain altering circuits 51 are switched to the side of the gain setting circuits 53 so that the modes are brought to the second modes. Accordingly, when the operating lever 32 is operated, the gain K given from the gain setting circuit 53 is multiplied by the operational signal outputted from the operational-signal generator 33, at the multiplier 56, and is supplied to the control valve as the control signal. If the gain K of the gain setting circuit 53 is set to a value smaller than "1", the maximum flow rate in the stroke $S_0$ is lowered to $Q_1$, following the gain K as indicated, for example, by the broken line in FIG. 5, and the state of occurrence and change of flow rate until the maximum flow rate $Q_1$ is reached is also altered. In this manner, the actuator is operated by the operational-speed characteristic of the second mode different from the normal operational-speed characteristic. According to the hydraulic driving apparatus of the aforementioned second embodiment, in addition to the advantages described with reference to the aforesaid first embodiment, there are further provided such advantages that, since the operational gain can be altered, it is possible to improve the minute operability and it is possible to set the operability according to an operator's preference.

Figure 6:
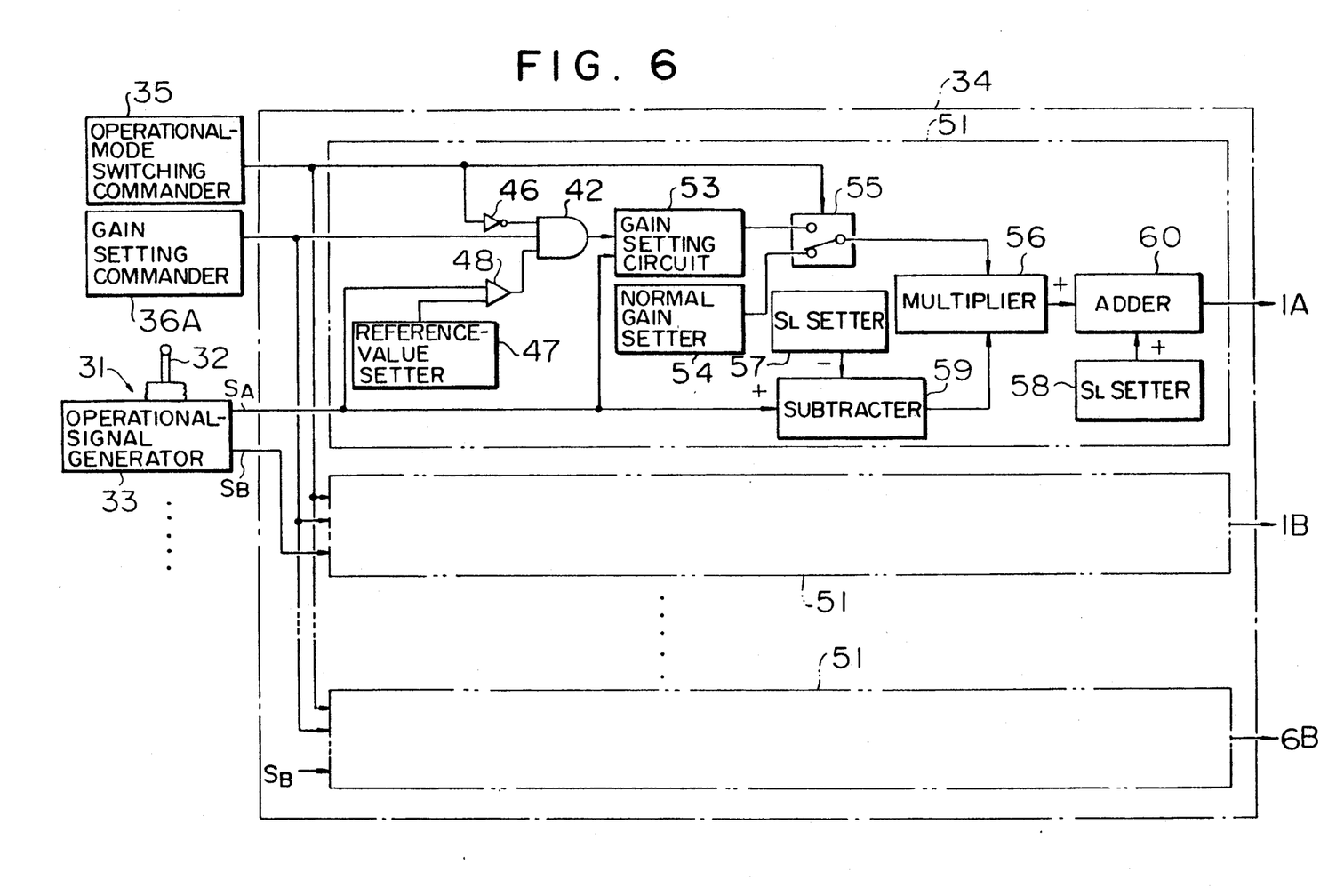
FIG. 6 is a circuit diagram showing a third embodiment of the control-valve control circuit.

A third embodiment of the control-valve control circuit 34 will next be described with reference to FIG. 6. This embodiment is fundamentally identical in construction to the control-valve control circuit of the second embodiment, but a slight modification is added to the third embodiment. In addition to the arrangement illustrated in FIG. 4, a gain altering circuit 51 illustrated in FIG. 6 is further provided with setters 57, 58 each having beforehand set therein the aforesaid operational-lever stroke $S_L$, a subtracter 59 for subtracting an output signal of the setter 57 from the operational signal of the operational-signal generator 33 to give the thus obtained signal to the multiplier 56, and an adder 60 for adding an output signal from the setter 58 to the output signal from the multiplier 56 to give a control signal to the drive section of the corresponding control valve.

With the arrangement described above, an amount of signal $S_Q$ of the control signal 1A outputted from the adder 60 can be represented by the following expression of relation:

$$S_Q = (S - S_L) \cdot K + S_L$$

Figure 7:
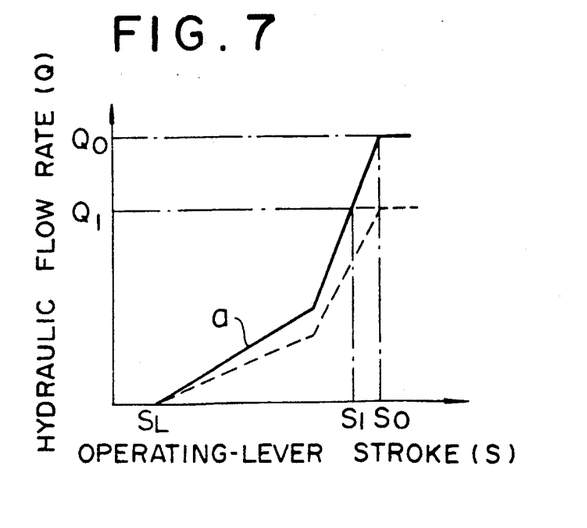
FIG. 7 is a characteristic view showing the relationship between an operating-lever stroke and hydraulic flow rate in the third embodiment.

According to this expression of relation, as indicated by the broken line in FIG. 7, the initial point of the second-mode operational-speed characteristic coincides with $S_L$. Thus, according to the hydraulic driving apparatus having the control-valve control circuit of this third embodiment, in addition to the aforementioned advantages, there is provided such an advantage that it is possible to bring the follow-up relationship between the operation of the operating lever in the first mode at the normal working and the operation of the control valve, equivalent to the follow-up relationship between the operation of the operating lever in the second mode at special working and the operation of the control valve, whereby there is obtained excellent operability.

In the aforementioned embodiments, a total of twelve maximum opening-degree limiting circuits 41 or gain altering circuits 51 are provided with one for two with respect to each operating-lever device 31. However, only one maximum opening-degree limiting circuit or gain altering circuit may be arranged to the minimum. In addition, although, in the previous embodiments, the electric circuits such as the control circuit and so on are constituted by hardware, software embodied in a microcomputer system or the like may be utilized to constitute the electric circuits.

INDUSTRIAL APPLICABILITY

In the hydraulic machine equipped with a plurality of actuators, the hydraulic driving method and the hydraulic driving apparatus according to the invention can alter the operational-speed characteristics of a specific one or more of the plurality of actuators, in accordance with the working contents, thereby being capable of fulfilling the working accuracy and the working efficiency simultaneously. Thus, the method and the apparatus are particularly suitable for hydraulic machines such as a hydraulic excavator.

What is claimed is:

1. A hydraulic machine driving method for selectively altering an operational-speed mode of one or more of a plurality of hydraulic actuators driven by a common hydraulic source, comprising the steps of:
   selecting arbitrarily at least one of said plurality of hydraulic actuators for operational-speed mode alteration; and
   altering an operational-speed mode of each selected hydraulic actuator, said step of altering including the step of altering an operational-speed command signal quantity for each selected hydraulic actuator from a first operational-speed mode to a quantity corresponding to a second operational-speed mode without altering the operational-speed modes of the non-selected hydraulic actuators.

2. A hydraulic machine driving method as claimed in claim 1, wherein said first operational-speed mode altered in accordance with the operational-speed command signal quantity is a relatively maximum operational speed.

3. A hydraulic driving apparatus for a hydraulic machine having a plurality of hydraulic actuators driven by a common hydraulic source, a corresponding plurality of control valves for controlling at least the flow rate of hydraulic fluid supplied to the plurality of hydraulic actuators from the common hydraulic source, and a corresponding plurality of operating-lever means for outputting operational signals for operating the respective control valves, comprising:
   operational-mode switching command means for outputting a switching command signal for altering an operational mode of at least one of the hydraulic actuators between a first operational-speed mode and a second operational-speed mode that is relatively slower than the first operational-speed mode;
   second-mode setting command means for outputting a setting command signal for setting the second mode of at least one of the plurality of hydraulic actuators; and
   control means for controlling the hydraulic actuators responsive to the operational signals outputted from the operational-lever means, the switching command signal outputted from said operational-mode switching command means and the setting command signal outputted from said second-mode setting command means; said control means including means for selecting at least one of the plurality of hydraulic actuators and for setting the second mode for the selected hydraulic actuators on the basis of a combination of the setting command signal and the operational signals outputted from the operational-lever means corresponding to the selected actuators; and said control means further including means for outputting control signals to the corresponding control valves for operating the non-selected hydraulic actuators in said first mode.

4. A hydraulic driving apparatus as claimed in claim 3, wherein said control means includes maximum opening-degree limiting means by which maximum opening degrees of the respective control valves are altered to realize said second mode.

5. A hydraulic driving apparatus as claimed in claim 3, wherein said control means includes gain altering means for altering gain characteristics of the control signals supplied respectively to said control valves to realize said second mode.

6. A hydraulic driving apparatus as claimed in claim 5, wherein said gain altering means is arranged to bring initial points of the gain characteristics of the control signals relating to said second mode into coincidence, respectively, with initial points of the gain characteristics of the control signals relating to said first mode.

7. A hydraulic driving apparatus as claimed in claim 6, further comprising means for storing individual optimized operational modes for the plurality of hydraulic actuators.

8. A hydraulic machine driving method for altering an operational-speed mode of a plurality of hydraulic actuators driven by a common hydraulic source in accordance with an operational-speed command signal, comprising the steps of:

selecting arbitrarily at least one of the plurality of hydraulic actuators to alter an operational-speed mode of the selected actuators;

altering an operational-speed command signal quantity for the selected hydraulic actuators into a quantity corresponding to a relatively slow operational-speed mode without altering the operational-speed modes of non-selected hydraulic actuators, by operating operating-lever devices for the selected hydraulic actuators;

setting said altered operational-speed modes of said hydraulic actuators; and operating said hydraulic actuators according to said set operational-speed mode responsive to the operation of said operating-lever devices corresponding to said hydraulic actuators in which said altered operational-speed mode is set.

9. A hydraulic machine driving method as claimed in claim 8, wherein said relatively slow operational-speed mode is altered continuously and set in correspondence with the operation of the corresponding operational-lever devices.

* * * * *